UNITED STATES PATENT OFFICE.

CHARLES H. COLLAGAN, OF PHILADELPHIA, PENNSYLVANIA.

IMPROVEMENT IN COMPOUNDS FOR COLORING FERROTYPES.

Specification forming part of Letters Patent No. 176,282, dated April 18, 1876; application filed February 9, 1876.

*To all whom it may concern:*

Be it known that I, CHAS. H. COLLAGAN, of Philadelphia, in the county of Philadelphia and State of Pennsylvania, have invented a certain new and useful Process and Compound for Finishing Ferrotypes; and I do hereby declare the following to be a full, clear, and exact description of the invention, such as will enable others skilled in the art to which it pertains to make and use it, reference being had to the accompanying drawings, which form part of this specification.

My invention has for its object to provide means for finishing ferrotypes or positive iron-plate pictures in colors. My invention accordingly relates to the application, as hereinafter described, of pastel colors, to give a finish to pictures of the class above mentioned.

In carrying my invention into effect I use a peculiar compound. Said compound consists of pastel, of any color, combined with anhydrous peroxide of iron. The proportions of the iron-salt mentioned and of the pastel will be varied according to the skill of the artist, the tint desired, and color used. In some cases ten parts of said iron-salt will be used to ninety of the pastel, while again two-thirds of the compound may be made up of said salt, the remaining one-third being pastel. Both the materials mentioned are to be reduced to a fine powder and intimately mixed or mingled until they form a compound.

The method of applying the compound is as follows: After the plate has been exposed in the camera and the picture developed in the dark closet and then cleared and dried, a soft brush is dipped in the compound (which should be spread for convenience on a stone or glass slab) and the picture then touched up therewith. In applying the compound to the picture, the brush should be revolved or made to describe circles or approximate figures, for if drawn straight across it will form lines or scratches, utterly marring the beauty of the work.

The particular shade or color of pastel used forms no part of the present invention, as I reserve the liberty of using any shade or color to produce any tint desired.

The office of the anhydrous peroxide is to fix the pastel firmly to the picture, thus rendering the color, which could otherwise be easily removed, permanent and quite ineffaceable.

What I claim as my invention is—

The compound herein described for coloring ferrotypes or positive iron-plate pictures, composed of pastel and anhydrous peroxide of iron in about the proportions specified.

In testimony that I claim the foregoing I have hereunto set my hand this 5th day of February, 1876.

CHAS. H. COLLAGAN.

Witnesses:
M. DANL. CONNOLLY,
CHAS. F. VAN HORN.